United States Patent [19]
Frank

[11] Patent Number: 4,750,014
[45] Date of Patent: Jun. 7, 1988

[54] OPTICAL DEVICE
[75] Inventor: Lee F. Frank, Rochester, N.Y.
[73] Assignee: Eastman Kodak Company, Rochester, N.Y.
[21] Appl. No.: 920,548
[22] Filed: Oct. 20, 1986
[51] Int. Cl.⁴ .................... G03B 17/20; G02F 1/135
[52] U.S. Cl. .................... 354/471; 354/219; 354/289.1; 350/337; 350/352; 350/388; 340/705
[58] Field of Search .................... 354/471–475, 354/219, 224, 225, 289.1, 289.12; 350/330, 331 R, 337, 352, 335, 388, 339 F; 340/705, 716; 358/224–226

[56] References Cited

U.S. PATENT DOCUMENTS

| | | | |
|---|---|---|---|
| 3,727,527 | 4/1973 | Borowski et al. | 95/10 R |
| 3,994,565 | 11/1976 | Van Dorn et al. | 350/160 LC |
| 4,051,503 | 9/1977 | Uno et al. | 354/289 |
| 4,124,278 | 11/1978 | Grinberg et al. | 350/342 |
| 4,140,378 | 2/1979 | Suzuki et al. | 354/53 |
| 4,173,757 | 11/1979 | Hareng et al. | 350/337 X |
| 4,265,522 | 5/1981 | Matsumoto et al. | 354/474 X |
| 4,302,086 | 11/1981 | Suzuki et al. | 354/53 |
| 4,429,979 | 2/1984 | Terada | 354/289.1 |
| 4,461,560 | 7/1984 | Yoshino et al. | 354/475 |
| 4,571,627 | 2/1986 | Stempeck | 354/219 X |

FOREIGN PATENT DOCUMENTS 1588896  4/1981  United Kingdom .

Primary Examiner—W. B. Perkey
Attorney, Agent, or Firm—Donald D. Schaper

[57]  ABSTRACT

This disclosure relates to an optical device which includes means for forming a pair of images in an optical channel and means for viewing the images. The viewing means includes a liquid crystal display, an eyelens, and an analyzer arranged between the liquid crystal display and the eyelens. In order to provide for selectively viewing one of the images, the image forming means is adapted to orthogonally polarize the images and project the polarized images onto the liquid crystal display. When the display is energized, one of the images can be viewed through the eyelens; and when the display is unenergized, the other image can be viewed through the eyelens.

14 Claims, 2 Drawing Sheets

OPTICAL DEVICE

FIELD OF THE INVENTION

The present invention relates to an optical device, and more particularly, to an optical device which is particularly adapted for use as a viewfinder in apparatus such as a camera.

DESCRIPTION OF THE PRIOR ART

In many optical devices, it is desirable to display information from two separate sources. For example in the viewfinder of a camera, it is desirable to see the subject as well as to have information displayed concerning camera data, such as shutter speed or light conditions. An ideal viewfinder for cameras should provide a clear, unobstructed view of the subject and equally clear graphics when indicating camera data. In prior art viewfinders, such data is normally displayed around the margin of the image in order not to obscure the picture area.

U.S. Pat. No. 4,140,378, discloses a viewfinder having a liquid crystal cell within the viewfinder. Mask means are provided to cover a portion of the liquid crystal cell so that only a display part of the cell is shown within the viewfinder, and a light source is operable in response to a brightness detecting circuit to illuminate the liquid crystal cell. A problem with the patented viewfinder is that the liquid crystal cell and the mask means for the cell take up a portion of the viewfinder, thereby reducing the size of the viewing area. A further disadvantage is that only a very limited amount of data can be displayed in a liquid crystal cell of the type disclosed in the patent.

SUMMARY OF THE INVENTION

It is an object of the present invention to overcome the problems in the prior art noted above and to provide an optical device which can selectively provide a clear unobstructed view of an image from either of two sources.

In accordance with one aspect of the invention, there is provided an optical device comprising: means for forming two images on a liquid crystal display; and means for selectively viewing one of the images independently of the other.

In accordance with another aspect of the invention, there is provided a viewfinder comprising means for forming an image of a scene, means for producing graphic information, means for viewing the image and the information, the viewing means including a liquid crystal display characterized in that the forming means comprises means for forming an image of the information and means for projecting the images onto the liquid crystal display, and the viewing means comprises means for viewing the images independently of each other.

In one embodiment of the present invention, a first image, for example graphic information, is transmitted along one optical channel to a polarizing beam splitter, and a second image, for example a scene, is transmitted along a second optical channel to the beam splitter. A polarizer is disposed in each optical channel such that the images are orthogonally polarized. The orthogonally polarized images are projected onto a liquid crystal display. When the liquid crystal display is energized, one of the images can be viewed through an analyzer, and when the display is not energized, the other image is seen through the analyzer.

The present invention provides an optical device which is particularly suitable for selectively viewing images from two different sources. In one embodiment of the invention, either one of the images can be viewed over the entire viewing area of the device; an advantage of this arrangement is that the device can be made smaller than would otherwise be possible, inasmuch as a portion of the viewing area is not taken up by a display such as a liquid crystal display. It is also possible, by energizing different portions of the liquid crystal display, to view two or more images adjacent each other.

Other features and advantages will become apparent fom reference to the following description of the preferred embodiment when read in light of the attached drawings.

DESCRIPTION OF THE PREFERRED EMBODIMENT

Figure 1:
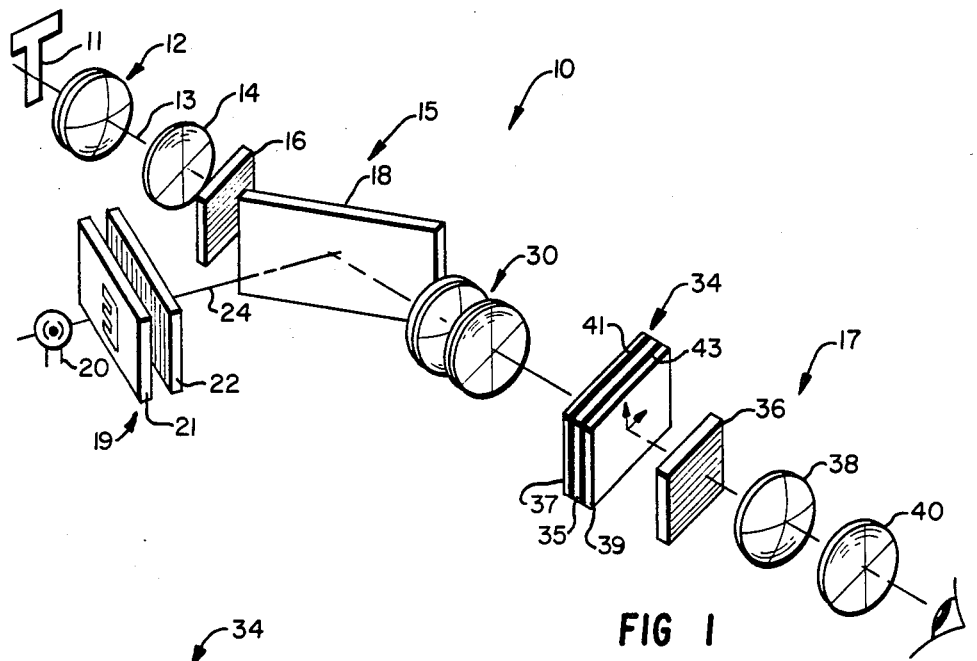
FIG. 1 is a perspective view showing the arrangement of the elements in the optical device of the present invention.

With reference to FIG. 1, there is shown an optical device 10 constructed in accordance with the present invention. Optical device 10 comprises image forming means 15 and image viewing means 17. Image forming means 15 includes an objective lens 12 which is adapted to form an image of an object 11 along a first optical channel 13, a field lens 14, a polarizer 16, and a polarizing beam splitter 18. A second image originates with a graphics-producing device 19 indicated schematically by a bulb 20 and a panel 21 having the letter E formed thereon; the second image passes through a polarizer 22 and travels along an optical channel 24 to beam splitter 18. The direction of polarization of light passing through polarizer 16 is at an angle of 90° to the direction of polarization of light passing through polarizer 22.

From polarizing beam splitter 18, both images pass through a relay lens group 30 and are transmitted to the image viewing means 17 which includes a liquid crystal display 34. From display 34, the images pass through an analyzer 36, a field lens 38, and an eyelens 40.

As shown in FIG. 1, display 34 comprises a liquid crystal 35 which is sandwiched between glass supporting plates 37 and 39; electrodes 41 and 43 are mounted respectively on plates 37 and 39. The construction of liquid crystals is well known in the art, and thus, their construction will not be explained herein in detail. The liquid crystal 35 can be of the nematic type and consist, for example, of p,p'-din-butylazoxy benzene, and it can be about 0.015 mm in thickness. Other elements can also be used to perform the function described herein for liquid crystal 35. For example, solid electro-optic crystals or ceramic crystals can also be used.

Control of display 34 can be effected by energizing liquid crystal 35 with a voltage of about 10 volts AC. The voltage to liquid crystal 35 could be turned on and off, for example, by movement of a camera shutter release (not shown). The inside surfaces of the supporting plates 37 and 39 are provided in a known manner with parallel grooves (not shown), and the direction of the grooves in the plate 37 is at a right angle to the direction of the grooves in plate 39. If there is no voltage between electrodes 41 and 43, the molecules of the liquid crystal 35 will orient parallel to the grooves in the layers adjoining plates 37 and 39, since the elastic deformation energy in the layer is then at a minimum. Consequently, a twisted configuration is formed in the liquid crystal 35, the orientation of the molecules changing gradually through the thickness of the crystal 35. Such a twisted configuration has the property of rotating the direction of polarization of incident linearly polarized light. The linear polarization of the light is then maintained when the direction of polarization of the incident light is parallel to or at right angles to the orientation of the molecules on the side where the light is incident. Thus, in display 34, the direction of polarization is rotated through 90° in the unenergized condition, and in the energized condition, the light is passed without rotation of the direction of polarization. Analyzer 36 is, in fact, a polarizer.

Figure 2:
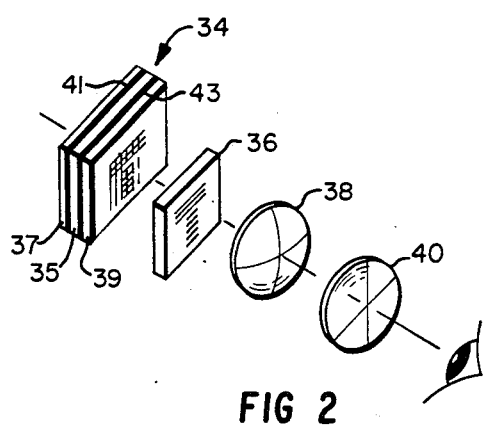
FIG. 2 is a perspective view showing the operation of the device when the liquid crystal display is energized.
Figure 3:
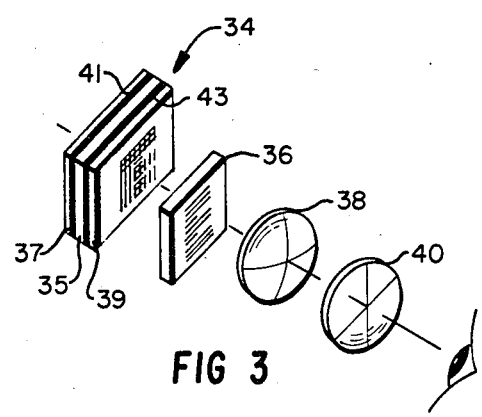
FIG. 3 is a view similar to FIG. 2 showing the operation of the device when the liquid crystal display is unenergized.

In the operation of device 10, two othogonally polarized images, indicated schematically in FIGS. 2 and 3 by superposed letters T and E, are presented to display 34. In the energized state of liquid crystal 35, both images would pass through display 34 without change, and with analyzer 36 set to receive horizontally polarized light, the viewer would see the letter T. In the unenergized state of liquid crystal 35 the direction of polarization would be rotated 90°, and the viewer would see the vertically polarized image, that is the letter E. In the operation just discussed, the position of analyzer 36 does not change in the energized and unenergized states. Under some conditions, however, it may be desirable to see the images superposed. To obtain this condition, analyzer 36 must be rotated to a 45° angle to the horizontal and the liquid crystal 35 must be in the unenergized state. In the event device 10 is used as a viewfinder in a camera (not shown), graphic data, for example shutter speed, could be superposed on a view of the subject; in this application, the data would appear as an opaque luminous display in front of the scene.

Figure 4A:
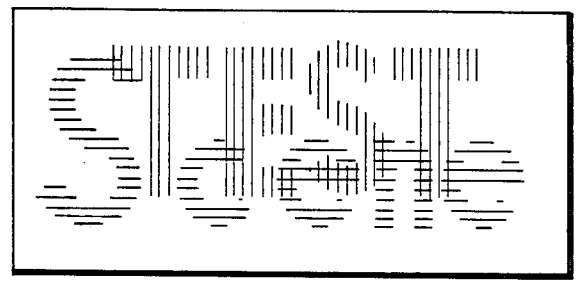
FIGS. 4a–4c are diagrams to illustrate the operation of a second embodiment of the invention.
Figure 4B:
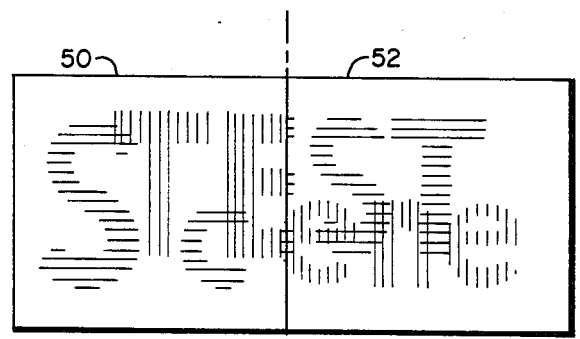
Figure 4C:
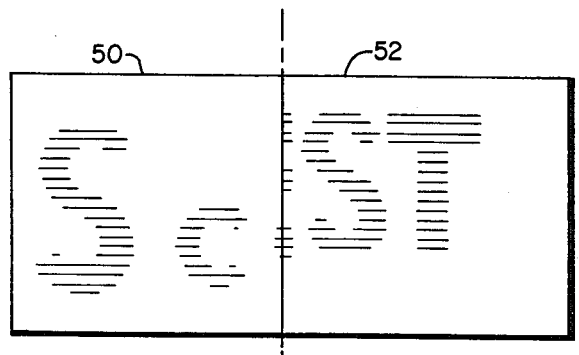

Any area of the liquid crystal 35 can be selectively energized by techniques well known in the art. In FIGS. 2 and 3, the electrodes extend over essentially the entire viewing area, and thus, with analyzer 36 fixed, the viewer sees either one image or the other. In FIGS. 4a–4c, there are shown a series of diagrams which illustrate another embodiment of applicant's invention in which only a portion of the liquid crystal 35 is energized. In FIG. 4a, the two orthogonally polarized images, indicated by the words "test" and "scene" are shown as they are presented to display 34. In FIG. 4b, the images are shown after they have passed through liquid crystal 35 in which a left portion 50 has passed through an energized portion of liquid crystal 35 and a right portion 52 has passed through an unenergized portion of liquid crystal 35. In FIG. 4c, the images are shown after passing through analyzer 36 and as they would be seen by the viewer. If such an arrangement was used in a viewfinder of a camera, the viewer could have a constant view of the scene and also receive camera information in the viewfinder during any desired portion of a picture-taking cycle.

It will be apparent that the present invention could be used to selectively view more than two images. For example, two devices 10 could be placed in a cascade arrangement to achieve such a result. Also, a movable mirror could be located to direct a selected one of a plurality of images along one of the channels 13, 24.

The invention has been described in detail with particular reference to certain embodiments thereof, but it will be understood variations and modifications can be effected within the spirit and scope of the invention.

I claim:

1. An optical device for viewing an image formed on a liquid crystal display disposed in an optical channel thereof, said optical device comprising:

means for forming two orthogonally-polarized superposed images on said liquid crystal display, said forming means including lens means in said channel for forming an image on said display of an object in the channel; and means in said channel for selectively viewing one of said images independently of the other, said viewing means including means for energizing said display.

2. An optical device, as defined in claim 1, wherein said viewing means comprises means for controlling the rotation of polarization in said display.

3. An optical device, as defined in claim 3, wherein said viewing means comprises means for analyzing light passed through said display.

4. An optical device, as defined in claim 4, wherein said analyzing means is mounted for movement relative to said display, and said analyzing means is movable to a position wherein both of said images can be viewed simultaneously.

5. An optical device, as defined in claim 1, wherein said forming means comprises a first polarizer arranged to polarize light from said lens means.

6. An optical device, as defined in claim 5, wherein said forming means comprises a graphics producing device and a second polarizer.

7. An optical device, as defined in claim 6, wherein said forming means comprises a polarizing beam splitter disposed to intercept light from said objective lens means and light from said graphics producing device.

8. An optical device comprising means for forming a plurality of images and means for viewing an image, said viewing means including a liquid crystal display characterized in that said forming means comprises means for projecting superposed images on said display, and said viewing means comprises means for viewing a selected one of said images when said liquid crystal display is energized and the other of said images when said liquid crystal display is not energized.

9. An optical device according to claim 8, characterized in that said viewing means comprises means for analyzing light passed through said display.

10. An optical device according to claim 9, characterized in that said viewing means comprises means for controlling the rotation of polarization in said display.

11. A viewfinder comprising means for forming an image of a scene, means for producing graphic information, and means for viewing said image and said information, said viewing means including a liquid crystal display characterized in that said forming means comprises means for forming an image of said information and for projecting superposed images of said scene and said information onto said liquid crystal display, and said viewing means comprises means for viewing said images independently of each other.

12. A viewfinder according to claim 11, characterized in that said forming means comprises means for orthogonally polarizing said images.

13. A viewfinder according to claim 11, characterized in that said means for viewing said images comprises means for viewing one of said images at a time.

14. A viewfinder according to claim 11, characterized in that said means for viewing said images comprises means for viewing said images side by side.

* * * * *

UNITED STATES PATENT AND TRADEMARK OFFICE
CERTIFICATE OF CORRECTION

PATENT NO. : 4,750,014
DATED : June 7, 1988
INVENTOR(S) : Lee F. Frank

It is certified that error appears in the above-identified patent and that said Letters Patent are hereby corrected as shown below:

Column 4, line 25, change "claim 3" to -- claim 2 --.

Column 4, line 28, change "claim 4" to -- claim 3 --.

Signed and Sealed this

Twenty-third Day of August, 1988

Attest:

DONALD J. QUIGG

*Attesting Officer*     *Commissioner of Patents and Trademarks*